(12) United States Patent
Rumala

(10) Patent No.: US 10,809,057 B2
(45) Date of Patent: Oct. 20, 2020

(54) METHODS FOR CONFOCAL OPTICAL PROTRACTOR WITH STRUCTURED LIGHT ILLUMINATION TO DETERMINE ANGLES

(71) Applicant: NORTHROP GRUMMAN SYSTEMS CORPORATION, Falls Church, VA (US)

(72) Inventor: Yisa S. Rumala, New York, NY (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 49 days.

(21) Appl. No.: 16/411,921

(22) Filed: May 14, 2019

(65) Prior Publication Data

US 2020/0132444 A1  Apr. 30, 2020

Related U.S. Application Data

(63) Continuation of application No. 16/171,883, filed on Oct. 26, 2018, now Pat. No. 10,670,391.

(51) Int. Cl.
*G01B 11/26* (2006.01)
*G01B 9/00* (2006.01)
(Continued)

(52) U.S. Cl.
CPC ............. *G01B 11/26* (2013.01); *G01B 9/00* (2013.01); *G01C 1/00* (2013.01); *G01D 5/266* (2013.01); *H01S 3/08045* (2013.01)

(58) Field of Classification Search
CPC . G01B 11/26; G01B 9/00; G01C 1/00; G01D 5/266; G02B 17/004; G02B 27/0927; G02B 5/04; G02B 26/06; G01P 3/36
(Continued)

(56) References Cited

U.S. PATENT DOCUMENTS

| 3,790,284 A | 2/1974 | Baldwin |
| 3,975,102 A | 8/1976 | Rosenfeld et al. |

(Continued)

FOREIGN PATENT DOCUMENTS

WO  2012037909 A2  3/2012

OTHER PUBLICATIONS

Wang Wen-Liang et al., Three-Dimensional Angular Measurement Based on Moiré Fringe, Aug. 24, 2010, pp. 1-7, vol. 7544 No. 1, International Symposium on Precision Engineering Measurements and Instrumentation, SPIE, Bellingham, WA, US.

(Continued)

*Primary Examiner* — Yaritza Guadalupe-McCall
(74) *Attorney, Agent, or Firm* — Shumaker, Loop & Kendrick, LLP; John A. Miller

(57) ABSTRACT

A method for simultaneously measuring roll angle, pitch angle and yaw angle of an element. The method includes directing a laser beam into a spiral phase plate resonator (SPPR) device to generate an optical vortex intensity pattern having a centroid and radial light peaks. The method reflects the laser beam off of the element after it has propagated through the SPPR device so that the laser beam is directed onto a camera that generates images of the optical vortex intensity pattern. The method determines a location of the centroid in the images, determines integrated counts along a radial direction from the centroid in the images, and determines a location of the radial light peaks in the images using the integrated counts. The method changes the frequency of the laser beam to rotate the radial light peaks, and estimates the roll angle of the element from the change in frequency.

20 Claims, 12 Drawing Sheets

(51) Int. Cl.
　　　　*G01C 1/00*　　　(2006.01)
　　　　*G01D 5/26*　　　(2006.01)
　　　　*H01S 3/08*　　　(2006.01)
(58) Field of Classification Search
　　　　USPC .......................................................... 33/290
　　　　See application file for complete search history.

(56) References Cited

U.S. PATENT DOCUMENTS

| | | | |
|---|---|---|---|
| 3,977,789 | A | 8/1976 | Hunter et al. |
| 4,257,164 | A | 3/1981 | Task et al. |
| 4,443,103 | A * | 4/1984 | Erdmann ............... G01B 11/26 250/202 |
| 4,746,216 | A | 5/1988 | Sommargren |
| 5,028,137 | A | 7/1991 | Sommargren et al. |
| 5,283,796 | A | 2/1994 | Fink |
| 6,134,259 | A | 10/2000 | Danziger et al. |
| 6,188,078 | B1 | 2/2001 | Bell, Jr. et al. |
| 6,813,286 | B1 | 11/2004 | Danziger et al. |
| 6,954,990 | B2 | 10/2005 | Ellis |
| 8,099,876 | B1 | 1/2012 | Truncale et al. |
| 9,423,360 | B1 | 8/2016 | Kostamo et al. |
| 9,753,241 | B2 | 9/2017 | Benischek et al. |
| 9,863,844 | B2 | 1/2018 | Oya et al. |
| 10,218,145 | B1 | 2/2019 | Lin et al. |
| 10,323,934 | B1 | 6/2019 | Rumala |
| 10,670,391 | B2 * | 6/2020 | Rumala ................. G01B 11/26 |
| 2003/0020903 | A1 | 1/2003 | Healy et al. |
| 2006/0191148 | A1 | 8/2006 | Lippuner |
| 2013/0250285 | A1 | 9/2013 | Bridges et al. |
| 2015/0345950 | A1 | 12/2015 | Sagemueller et al. |
| 2015/0377605 | A1 * | 12/2015 | Bridges ................ G01B 11/002 382/106 |
| 2016/0109228 | A1 | 4/2016 | Ohtomo et al. |
| 2017/0363448 | A1 | 12/2017 | Dunn et al. |
| 2020/0132443 | A1 * | 4/2020 | Rumala ............. G02B 27/0927 |
| 2020/0132444 | A1 * | 4/2020 | Rumala ................... G01B 9/00 |

OTHER PUBLICATIONS

PCT International Search Report of the International Searching Authority dated Mar. 3, 2020 for International Application No. PCT/US2019/057846 filed Oct. 24, 2019.
Fickler, Robert, Lapkiewicz, Radek, Plick, William N., Krenn, Mario, Schaeff, Christoph, Ramelow, Sven, Zeilinger, Anton; "Quantum Entanglement of High Angular Momenta"; Nov. 2, 2012; vol. 338; www.sciencemag.org; pp. 640-643.
Rumala, Yisa S.; "Wave transfer matrix for a spiral phase plate"; vol. 54, No. 25; May 10, 2015; Applied Optics; 1559-128X/15/144395-08.
Rumala, Yisa S.; "Sensitivity in frequency dependent angular rotation of optical vortices"; vol. 55, No. 8; May 10, 2016; Applied Optics; 1559-128X/16/082024-10.
Forbes, Andrew, Dudley, Angela, McLaren, Melanie; "Creation and detection of optical modes with spatial light modulators"; vol. 8, No. 2; Jun. 2016; Advances in Optics and Photonics.
Rumala, Yisa S., Leanhardt, Aaron E.; "Multiple-beam interference in a spiral phase plate"; vol. 30, No. 3; Mar. 2013; J. Opt. Soc. Am. B; 0740-3224/13/030615-07.
Rumala, Yisa S.; "Interference theory of multiple optical vortex states in spiral phase plate etalon: thick-plate and thin-plate approximation"; vol. 31, No. 6; Jun. 2014; Journal of the Optical Society of America B; 0740-3224/13/030615-07.
Rumala, Yisa S., Leanhardt, Aaron E.; "Optical vortex with a small core and Gaussian intensity envelope for light-matter interaction"; vol. 34, No. 5; May 2017; Journal of the Optical Society of America B; 0740-3224/17/050909-10.
D'Ambrosio, Vincenzo; Spagnolo, Nicolo, Del Re, Lorenzo, Slussarenko, Sergei, Li, Ying, Kwek, Leong Chuan, Marrucci, Lorenzo, Walborn, Stephen P., Aolita, Leandro, Sciarrino, Fabio; Photonic polarization gears for ultra-sensitive angula measurements; Nature Communications; 4:2432; DOI: 10.1038/ncomms3432; www.nature.com/naturecommunications; Published Sep. 18, 2013.
Rumala, Yisa S.; "Propagation of structured light beams after multiple reflections in a spiral phase plate"; Optical Engineering; http://opticalengineering.spiedigitallibrary.org/; Nov. 2015; vol. 54.
Yin, Yanhe; Cai, Sheng; Qiao, Yanfeng; "Design, fabrication, and verification of a three-dimensional autocollimator"; Optical Society of America; vol. 55, No. 35, Dec. 10, 2016, Applied Optics, pp. 9986-9991.
Ju, Aisong; Hou, Wenmei; Le, Yanfen; "Enhanced roll-angle measurement interferometer"; Optical Engineering, vol. 54, No. 3, p. 034101, 2015. 25, 2016.
Lavery, Martin P.J.; Barnett, Stephen M.; Speirits, Fiona C.; Padgett, Miles J.; "Observation of the rotational Doppler shift of a white-light, orbital-angular-momentum-carrying beam backscattered from a rotating body"; corresponding author: martin.lavery@glasgow.ac.uk; 2014 Optical Society of America; vol. 1 No. 1 / Jul. 2014 / Optica; 2334-2536/14/010001-04$15/0$15.00; Doc ID 210521; published Jul. 22, 2014.
Fickler, Robert; Campbell, Geoff; Buchler, Ben; Lam, Ping Koy; Zellinger, Anton; "Quantum entanglement of angular momentum status with quantum numbers up to 10.010"; Nov. 29, 2016; 13642-13647; vol. 113 No. 48; PNAS; www.pnas.org/cgi/doi/10.1073/pnas.1616889113.
Rumala, Yisa S.; Milione, Giovanni; Nguyen, Thien An; Pratavieira, Sebastiao; Hossain, Zabir; Nolan, Daniel; Slussarenko, Sergei; Karimi, Ebrahim; Marrucci, Lorenzo; and Alfano, Robert R.; "Tunable supercontinuum light vector vertex beam generator using a q-plate"; Optics Letters, vol. 38, No. 23, pp. 5083-5086, 2013.
Rumala, Yisa S.; "Optical Protractor to Measure Roll Angle on a Static Surface and Rotating Surface"; Utility U.S. Appl. No. 15/943,240, filed Apr. 2, 2018.
Rumala, Yisa S. and Luther, Gregory; "Scanning an Optical Beam about a Field of Regard with No Moving Parts"; Utility U.S. Appl. No. 15/928,347, filed Mar. 22, 2018.
Zhou, Hailong; Fu, Dongzhi; Dong, Jianji; Zhang, Pei; Zhang, Xinliang; "Theoretical analysis and experimental verification on optical rotational Doppler effect"; Optical Society of America; vol. 24, No. 9 DOI:10.1364/OE.24.010050 Optics Express 10050; published Apr. 28, 2016.
Zhao, Mingyang; Gao, Xinlu; Xie, Mutong; Zhai, Wensheng; Xu, Wenjing; Huang, Shanguo, Gu, Wanyi; "Measurement of the rotational Doppler frequency shift of a spinning object using a radio frequency orbital angular momentum beam"; 2016 Optical Society of America; vol. 41, No. 11 / Jun. 1, 2016 / Optics Letters p. 2549; Doc. ID 261469; corresponding author: shghuang@bupt.edu.cn; published May 25, 2016.

* cited by examiner

METHODS FOR CONFOCAL OPTICAL PROTRACTOR WITH STRUCTURED LIGHT ILLUMINATION TO DETERMINE ANGLES

CROSS-REFERENCE TO RELATED APPLICATIONS

This application is a continuation application of U.S. patent application Ser. No. 16/171,883, filed Oct. 26, 2018, and titled Confocal Optical Protractor.

BACKGROUND

Field

The present disclosure relates generally to a method for measuring roll angle, pitch angle and yaw angle of an element and, more particularly, to a method for simultaneously measuring roll angle, pitch angle and yaw angle of an element, where the method employs a spiral phase plate resonator (SPPR) device that generates an optical vortex pattern beam having intensity peaks that is reflected off of the element and onto a camera or detector.

Discussion

The non-contact measurement of angles, specifically roll, yaw and pitch angles, is often important when manufacturing optical components, building aerospace parts and system level metrology applications, including alignment and tracking, 3D printing, lithography, sample part fabrication, etc. Most approaches employed in the art that have been used to measure angle employ autocollimators, interferometers and mechanical devices with movable parts. Roll angle is the most challenging angle to measure, and thus, there are a limited number of systems capable of accurately measuring roll angle.

Autocollimators have been successful for measuring pitch and yaw angles with high precision, however, the range over which these angles can be measured is limited. Further, in order to measure roll angle, a complex arrangement of autocollimators is required. Interferometers can measure pitch angle and yaw angle, but cannot measure roll angle without a complex arrangement of additional optical elements, for example, polarization optics and prisms. Further, operation in rugged environments is limited for many free space optics. Mechanical devices, such as mechanical protractors, would require the system to be compact, and be severely limited for non-contact measurement of angle. Further, a system with movable parts would have a much higher probability of failure during operation over long periods of time.

Roll angles are typically measured by placing the part on a rotatable mount that includes built-in angular ticks along its circumference, and then rotating the mount to determine the roll angle of the part. This technique usually works well when building small parts, but can be challenging when fabricating large or very heavy aerospace system parts. Another known roll angle measuring technique includes placing a mechanical protractor on the part to determine the angle of interest between two fiducials. For this technique, the mechanical protractor would be in contact with the surface to determine the roll angle, which could be detrimental for applications requiring a non-contact measurement of the roll angle. In order to measure increasingly smaller angles in confined spaces, the radius of the protractor would have to be made larger (more angular ticks) or gears would be required on the mechanical protractor to amplify the precision of the angle being measured. This could easily increase the size of the mechanical protractor for high precision measurements, and thus be problematic when measuring angles in confined spaces. This task becomes even more challenging when measuring angles on curved surfaces. Furthermore, some applications in 3D printing, lithography and part fabrication in clean room environments require a non-contact determination of roll angle, where the mechanical protractor would be in contact with the part that is being measured. If the surface is rotating at a constant rate, the roll angle and rotation rate cannot be deduced with a mechanical protractor.

Optical systems may provide the ability for making non-contact measurements of angle between two static points or lines on a surface, even when the surface is curved and/or rough. In particular, by using a coherent superposition of optical vortices that has a built-in cylindrical symmetry, non-contact measurements of angle can be made to very high accuracy and precision. A property of a coherent superposition of optical vortices is that it forms a periodic intensity modulation as a function of roll angle (azimuthal angle), which can be projected on the surface for which the angle is being measured and sensed with a detector.

Various methods exist in the art to create a coherent superposition of optical vortices, including methods that use spatial light modulators, spiral phase plates in an interferometer, spiral phase mirrors in an interferometer, etc. However, these methods do not allow for controlling the roll angle of the optical vortex without causing a mechanical rotation of select parts of the optical system that limits the resolution, or the optical system consists of a complex arrangements of optical elements including motorized stages, i.e., for the case of spiral mirrors, q-plates, spiral phase plates, etc. For those methods that employ a spatial light modulator (SLM), a computer is required to control the SLM and its resolution and the generation of angular displacement is limited by the SLM screen being pixelated and the finite range of the phase change of the SLM. With these challenges, there is no clear way to miniaturize the system, while maximizing the precision of the angle measurement without further complicating the optical system design.

A resonator based on a spiral phase plate, i.e., a spiral phase plate resonator (SPPR) device, is a miniaturized optical element for which a coherent superposition of optical vortices can be generated by either reflecting light off of the device or transmitting light through the device. There have been fundamental scientific studies showing a resonator effect for a low reflectivity SPPR device. There have also been studies of a rotation sensor based on the rotational Doppler shift. However, there is yet to be a demonstration in the art of a full optical protractor system for technological applications, such as manufacturing and production, or determining the roll angle with respect to a fiducial in aerospace systems or otherwise.

U.S. patent application Ser. No. 15/943,240, titled, Optical Protractor To Measure Roll Angle On A Static Surface And Rotating Surface, filed Apr. 2, 2018, assigned to the assignee of this application and herein incorporated by reference, discloses an optical protractor that employs a spiral phase plate resonator (SPPR) device for measuring a roll angle between two points on a static surface or a rotating surface. The protractor includes a tunable laser source that generates a laser beam and an optical component responsive to and converting the laser beam to a single mode laser beam. The SPPR device receives the single mode laser beam, and includes opposing reflective surfaces that reflect the beam back and forth in the device. One of the reflective surfaces includes a spiral step index that causes multiple reflected beams having different phases to be combined as an output beam from the device having an optical vortex intensity pattern, where the intensity pattern includes radial light intensity lines. The protractor includes a lens that projects the output beam onto the element, a detector for detecting light reflected from the element and a processor responsive to signals from the detector. The processor generates images of the reflected light that include the optical vortex intensity pattern projected onto the element, and causes the laser source to change the frequency of the laser beam so that one of the intensity lines aligns with a first one of the points. The processor then causes the laser source to again change the frequency of the laser beam so that the one intensity line aligns with a second one of the points, where a difference between the frequencies of the laser beam is used to determine the angle between the points.

SUMMARY

The following discussion discloses and describes a method for simultaneously measuring roll angle, pitch angle and yaw angle of an element. The method directs a frequency tunable laser beam through a spiral phase plate resonator (SPPR) device, where the SPPR device includes opposing reflective surfaces that reflect the laser beam back and forth in the device, and where one of the reflective surfaces includes a spiral step index that causes multiple reflected amplitudes having different phases to be combined and generate an optical vortex intensity pattern defined by the phases of the multiple amplitudes, and where the intensity pattern includes a singularity centroid and radial light peaks, and where the SPPR device reflects or transmits a first beam and transmits a second beam. The method reflects the first beam off of a closed shutter so that the first beam is directed onto a first camera that generates images of the optical vortex intensity pattern, directs the second beam onto a second camera that generates images of the optical vortex intensity pattern, determines an initial frequency of the laser beam by an angular position of the radial light peaks in the images generated by the first and second cameras, and synchronizes a registration between the images generated by the first and second cameras. The method determines a location of the centroid in the images generated by the first camera and determines a location of the centroid in the images generated by the second camera. The method further determines integrated counts along a radial direction from the centroid in the images generated by the first camera as a function of beam roll angle, and determines a location of the radial light peaks in the images generated by the first camera using the integrated counts. The method also determines integrated counts along a radial direction from the centroid in the images generated by the second camera as a function of beam roll angle, and determines a location of the radial light peaks in the images generated by the second camera using the integrated counts. The method then opens the shutter so that the first beam propagates through the open shutter onto the element and a reflected first beam from the element is directed onto the first camera that again generates images including the optical vortex intensity pattern. The method again determines the location of the centroid in the images generated by the first camera, and again determines the integrated counts along the radial direction from the centroid in the images generated by the first camera as a function of beam roll angle. The method changes the frequency of the laser beam to rotate the radial light peaks in the optical vortex intensity pattern in the images generated by the first camera, and estimates the roll angle of the element from the change in frequency.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a method for simultaneously measuring roll, pitch and yaw angles of an element, where the method uses an SPPR device, is merely exemplary in nature and is in no way intended to limit the disclosure or its applications or uses.

As will be discussed in detail below, the present disclosure describes an optical system, or optical protractor, that provides an "all optical" process with no moving parts for measuring the roll, pitch and yaw angles of an element. The optical system has application for the manufacture and production of various components and parts, such as for unmanned aerial vehicles, planes, aircraft carriers, ballistic missiles, etc., where a non-contact measurement of pitch, yaw and roll angles of a part is important. The optical system also has machine vision applications, such as in robots and autonomous vehicles, to determine these angles during pattern recognition.

The main element of the optical system is a spiral phase plate resonator (SPPR) device in which a light beam at a certain frequency undergoes multiple reflected round trips within the device to create an output beam having an angular intensity modulation interference pattern as a function of beam angle. Precise changes of the wavelength of the beam entering the SPPR device rotate angular intensity peaks in the pattern of the beam output from the SPPR device that when projected onto a static surface can be detected to measure the pitch, yaw and roll angles. The intensity modulation interference pattern in the output beam is the result of a coherent superposition of select optical vortex winding numbers emerging from the SPPR device.

To ensure high accuracy of the angles being measured even under harsh environments, such as the presence of vibrations and temperature gradients, a method for calibrating the optical system is necessary. The method includes calibrating the rotation angle of the optical vortex intensity pattern to the wavelength of the beam, and monitoring the angular displacement of the optical intensity pattern on a detector, such as a CCD camera, with a reference beam. Any spurious changes in the optical system, such as changes in the wavelength of the beam from the laser source, changes in refractive index of the optics, or vibrations of the surface that is being measured, can be compensated during measurement of the angles. The images from the CCD camera are read in real time using image processing algorithms that have reduced errors when finding the center of optical vortices and other forms of systematic errors in the determination of the angles. The frequency of the input beam to the SPPR device is locked and varied using standard techniques, such as phase locking schemes, amplitude locking schemes, etc., and increments of the frequency would rotate the intensity pattern for measurement, calibration and real time monitoring.

Figure 1:
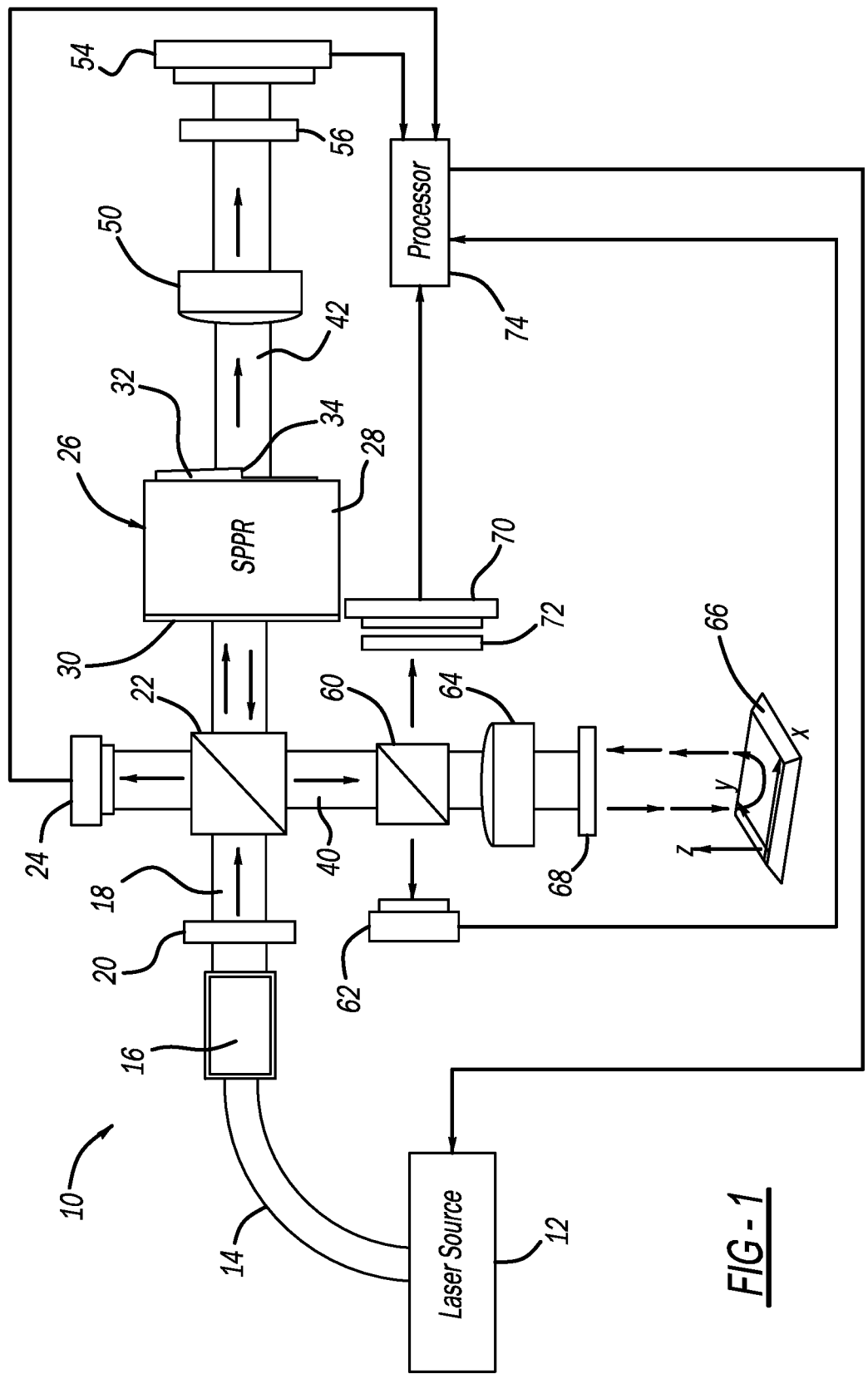
FIG. 1 is a schematic block diagram of a confocal optical protractor for measuring roll, pitch and yaw angles of an element, where a measurement beam is reflected from a spiral phase plate resonator (SPPR) device and then reflected off of the element.

FIG. 1 is a schematic block diagram of an optical system 10 of the type discussed above for simultaneously measuring the roll, pitch and yaw angles between fiducial lines on a static or rotating surface, and determining the rotation rate of the rotating surface. The system 10 includes a narrow linewidth laser source 12 that is tunable, and that emits a coherent laser beam, for example, in the visible-IR frequency range, into a single mode optical fiber 14 that provides a laser beam 18 in, for example, the $TEM_{00}$ Gaussian mode. In an alternate embodiment, other optical elements instead of the single mode optical fiber 14 can be employed to provide the $TEM_{00}$ Gaussian mode. For example, an appropriately designed aperture (not shown) could be used to put the beam 18 in the $TEM_{00}$ Gaussian mode or clean up the optical mode. The beam 18 emitted from the fiber 14 is collimated by a collimator 16 positioned at the end of the fiber 14 to ensure that the beam 18 propagates through the entire optical system 10 with minimal divergence. Light reflected back into the laser source 12 may cause beam jitter in the laser cavity causing intensity fluctuations of the output laser beam 18 or spurious frequency shifts in the laser wavelength, which could cause instability of the modes in the laser cavity and cause the laser source 12 to go out of lock. Therefore, an optical isolator 20 is positioned after the output of the collimator 16 to prevent back reflection of the laser beam 18 into the laser source 12.

Figure 2:
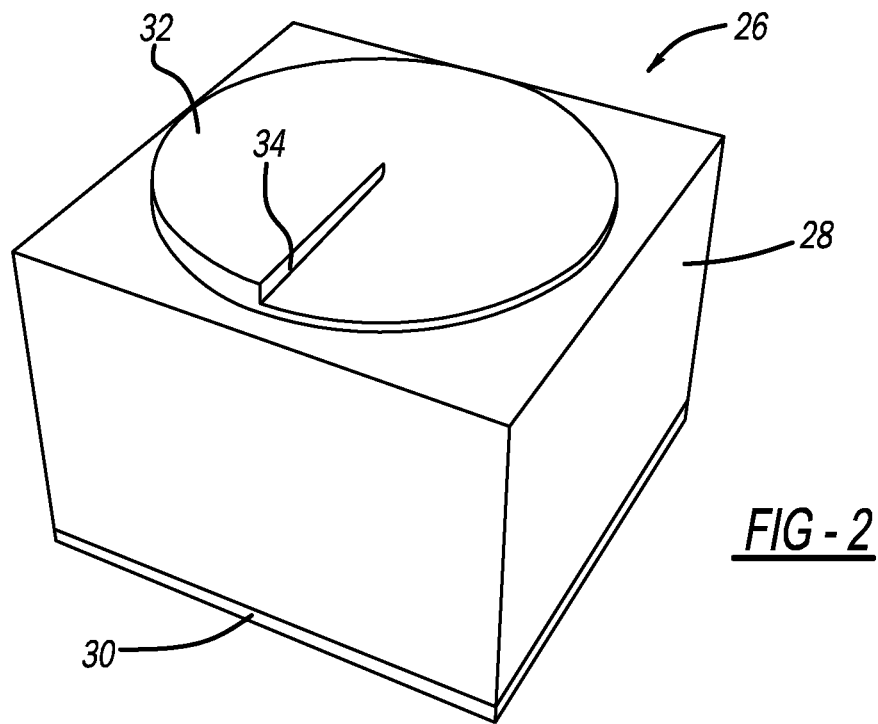
FIG. 2 is an isometric view of the SPPR device separated from the optical protractor shown in FIG. 1.
Figure 3:
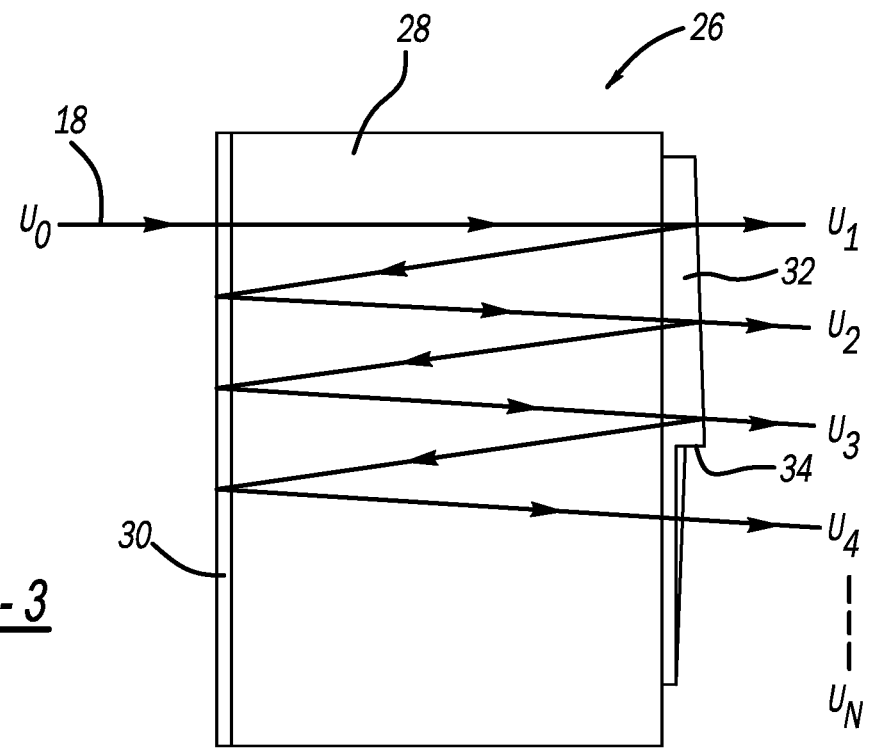
FIG. 3 is an side view of the SPPR device showing a beam being reflected therein.

The single mode beam 18 that propagates through the optical isolator 20 is split by a beam splitter 22 where a small portion of the beam 18 is sent to a fast detector 24 that monitors beam intensity and the remaining portion of the beam 18 is sent to an SPPR device 26, where it is reflected back and forth in the device 26 as a result of its finite reflectivity. FIG. 2 is an isometric view and FIG. 3 is a side view of the device 26 separated from the system 10. The device 26 includes an optically transparent block 28, such as glass, having a reflective plate 30, such as a smooth reflective material coating, on an input side of the block 28 that is optically transmissive enough to allow the beam 18 from the collimator 16 to propagate into the block 28. The device 26 also includes a step-wise spiral reflector 32, such as a polymer or glass layer having a reflective material coating, with an azimuthally varying step 34 having height Δh on an output side of the block 28 that is also optically transmissive enough so that an output beam can propagate therethrough and be output from the device 26. Although smooth reflective material coatings are employed in this design to provide reflective surfaces on the block 28, in alternate designs nanoscale structures can be used to provide the reflectivity of the beam 18 in the block 28.

If the beam 18 propagated through the block 28 with no surface reflectivity, an optical vortex beam with a well-defined winding number would be produced on the output plane of the device 26, where the device 26 would act as a spiral phase plate. By providing finite reflectivity on opposing surfaces of the device 26 and providing the reflector 32 having the gradually varying azimuthal thickness, the device 26 operates as a spiral phase plate resonator (SPPR), where an optical vortex beam is output from the device 26 as a coherent superposition of optical vortices separated by specific positive winding numbers. In other words, each reflection of the beam 18 within the device 26 creates an individual optical vortex beam having a unique phase that is output from the device 26, shown as amplitudes $U_1$-$U_N$, each having a different winding number, i.e., orbital angular momentum, where the beam is a superposition of all of the optical vortex amplitudes $U_1$-$U_N$ with different winding numbers having different orbital angular momentum states, and is referred to herein as an optical vortex intensity pattern. The optical vortex intensity pattern is thus a periodic intensity interference pattern based on the phase of the beams $U_1$-$U_N$ that varies as a function of the angle of the vortex beam, where the rotation of the intensity pattern is controlled by the frequency of the beam 18.

The optical vortex intensity pattern of the beam 18 is both output from the input side of the SPPR device 26 towards the beam splitter 22 as a reflected measurement beam 40 and is output from the output side of the SPPR device 26 as a transmitted reference beam 42 that is used for calibration purposes. In this non-limiting embodiment, the SPPR device 26 is a commercial-off-the-shelf (COTS) device having an internal reflectivity of approximately 0.04. This reflectivity causes the vortex intensity peaks in the measurement beam 40 to be of high contrast and the vortex intensity peaks in the transmitted reference beam 42 to be of low contrast. By using the reflected beam 40 for the angle measurements, the more distinct peaks allow background light to be more easily removed.

Figure 4:
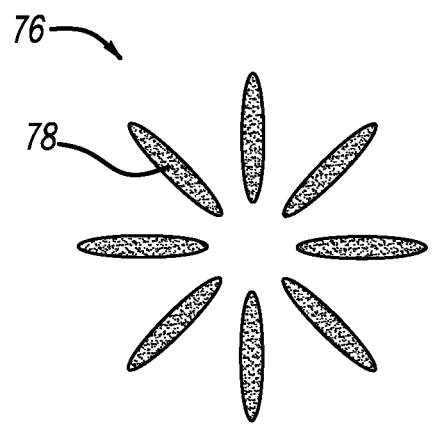
FIG. 4 is an illustration of a single pixel detector array including eight single pixel detectors arranged in a circle.

The reference beam 42 is imaged by a lens 50 positioned at two focal lengths from the SPPR device 26 onto a charge coupled device (CCD) camera 54 through an attenuator 56, and provides a reference of the beam orientation for roll angle calculations. The measurement beam 40 is reflected by the beam splitter 22 towards a second beam splitter 60 that directs a small portion of the measurement beam 40 to a detector 62 that keeps track of the orientation of the optical vortex measurement beam 40 and the intensity of the beam 40 reflected from the SPPR device 26. The detector 62 is shown as a multiple pixel detector, such as a CCD camera, but could be any detector suitable for the purposes discussed here. For example, the detector 62 could be a single pixel detector array 76 including eight single pixel detectors 78 arranged in a circle ring, as shown in FIG. 4. The circular ring could allow for measuring the rotational displacement of the beam 40 to high precision.

The main portion of the measurement beam 40 is imaged by a lens 64, or a series of lenses, onto a platform 66 through a shutter 68, where the lens 64 collimates the beam 40 to image the platform 66 in a confocal imaging geometry. The reflected beam from the platform 66 is directed by the beam splitter 60 to a CCD camera 70 that provides the angle measurements, where the lens 64 images the reflected beam on the camera. A narrowband filter 72 positioned in front of the camera 70 reduces the sources of background light at other wavelengths. Further, the lens 64 will reduce the field-of-view (FOV) of the camera 70, which also will reduce the amount of backscattered light entering the camera 70. When the shutter 68 is closed, the beam 40 is reflected onto the camera 70 through the beam splitter 60. When the shutter 68 is open, the beam 40 goes through the shutter 68 and is retro-reflected from the platform 66 onto the camera 70. The CCD camera 70 also serves to calibrate the initial position of the beam 40.

Figure 5:
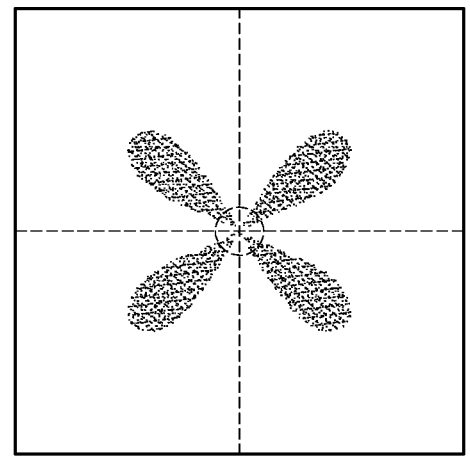
FIG. 5 is an optical vortex intensity profile image of the beam reflected from the SPPR device in the protractor shown in FIG. 1.
Figure 6:
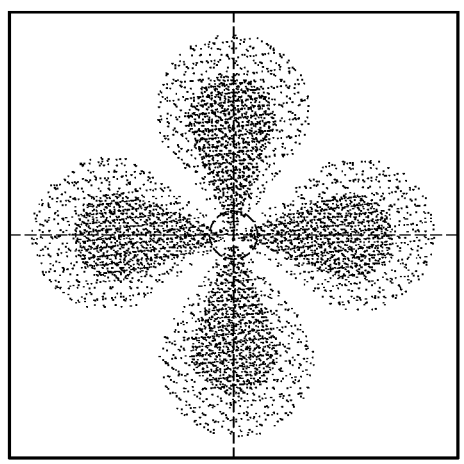
FIG. 6 is an optical vortex intensity profile image of a reference beam transmitted through the SPPR device in the protractor shown in FIG. 1.

An x-y-z coordinate system is illustrated relative to the platform 66, where rotation about the x-axis indicates yaw angle, rotation about the y-axis indicates pitch angle and rotation about the z-axis indicates roll angle. An optical vortex intensity profile of the measurement beam 40 having high contrast fringes as imaged on the camera 70 is illustrated in FIG. 5, where the device 26 is a low internal reflectivity SPPR device, such as $|r_2|^2=0.04$, where $r_2$ is the Fresnel coefficient of reflection at the surfaces of the SPPR device 26. An optical vortex intensity profile of the reference beam 42 having low contrast fringes as imaged on the camera 54 is illustrated in FIG. 6. In these illustrations, the shaded areas represent the vortex intensity peaks. The system 10 works well when a higher internal reflectivity device is implemented in this embodiment, and the SPPR device 26 could be facing in the forward direction or in the reverse direction.

The system 10 is calibrated in the same manner discussed above using the camera 54 for an accurate determination of the angles. From this measurement, a transfer function that effectively defines the calibration function of the optical system 10 is obtained. The transfer function converts a change in laser frequency to a change in angle, even in the presence of thermal effects of the elements in the optical system 10. Ideally, materials with a low coefficient of thermal expansion would be used in the optical system 10 for high precision measurements. Nevertheless, the camera updates from the calibration process before or during measurements enables angle determination on a static surface, even in the presence of thermal effects and vibrations. For measurements performed after the focus of the beam 42, the Gouy phase will cause an additional shift in the rotation of the reference beam 42. This effect is easily taken into account during the calibration of the optical system 10.

The system 10 allows the optical vortex beam to remain collimated over long distances for the purposes of illuminating the platform 66. To determine the roll angle, the frequency of the beam 18 is shifted to rotate the angular intensity profile. To measure the pitch angle and the yaw angle, the centroid of the beam 40 is moved from one point to another. A distance measuring device, such as LiDAR, RADAR, etc., can be used to estimate distance when measuring yaw angle and pitch angle.

Figure 7:
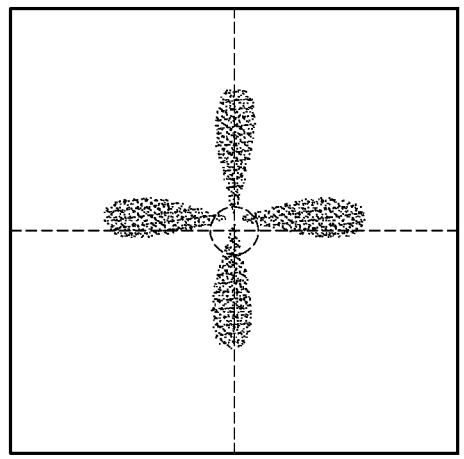
FIGS. 7 and 8 are the optical vortex intensity profile image shown in FIG. 5 with the beam reflected above and below the center point, respectively, for measuring pitch angle.
Figure 8:
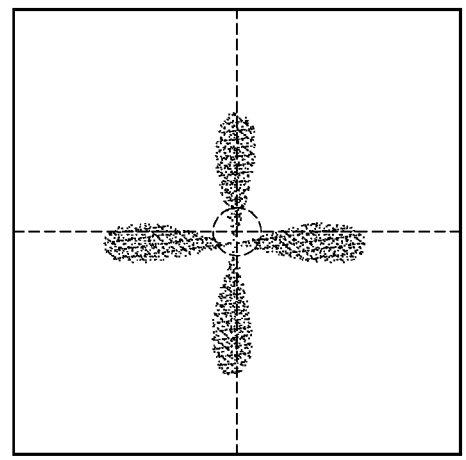
Figure 9:
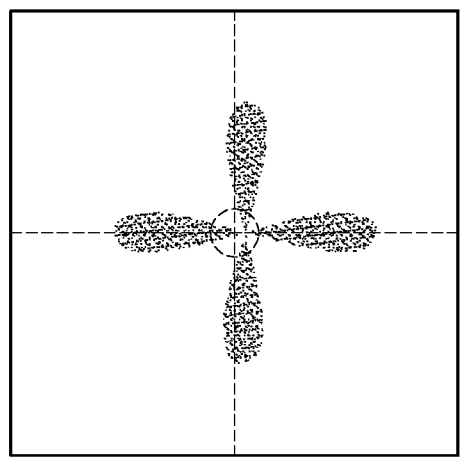
FIGS. 9 and 10 are the optical vortex intensity profile image shown in FIG. 5 with the beam moved to the left side and the right side, respectively, for measuring yaw angle.
Figure 10:
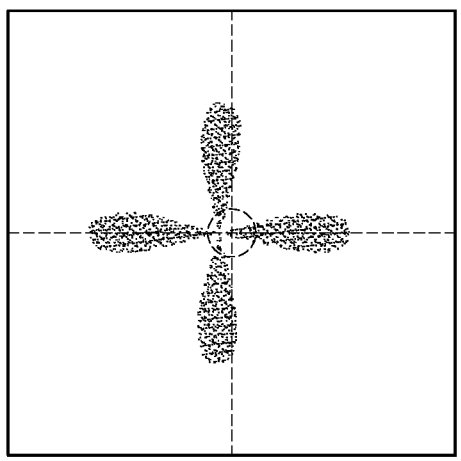
Figure 11:
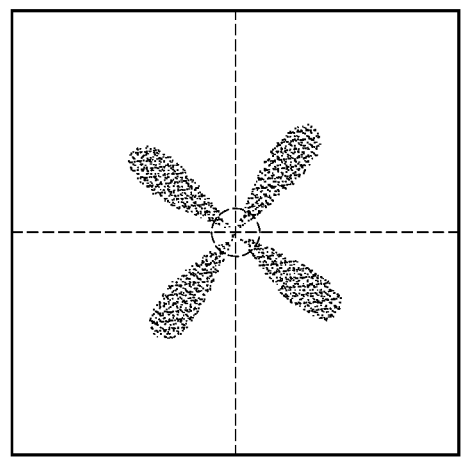
FIGS. 11 and 12 are the optical vortex intensity profile image shown in FIG. 5 with the beam rotated clockwise and counter-clockwise, respectively, for measuring roll angle.
Figure 12:
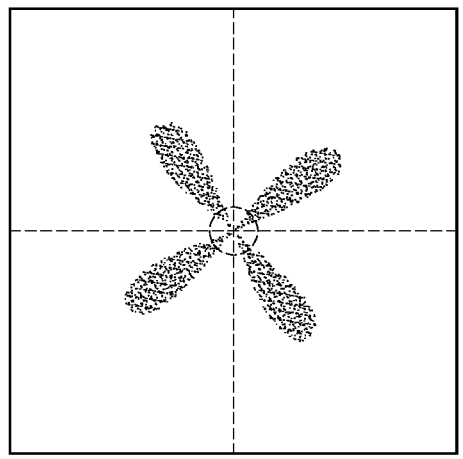

A processor 74 controls the system 10 and receives signals from the cameras 54 and 70 and the detector 62, and tunes the laser source 12, to determine the measurements of roll, yaw and pitch angles consistent with the discussion herein. As will be discussed in further detail below, the beam 40 is reflected from the platform 66 when it is in a reference position to determine the distance between the platform 66 and the camera 70 and identify an initial beam profile. A shift in the beam profile above or below the center point of the initial beam profile along the y-axis in the described orientation is a measure of the pitch angle as shown by the optical vortex intensity profile images in FIGS. 7 and 8. Further, a shift in the beam profile to the left or right of the center point of the initial beam profile along the x-axis in the described orientation is a measure of the yaw angle as shown by the optical vortex intensity profile images in FIGS. 9 and 10. It is noted that the distance to the platform 66 and a shift of the beam 40 on the camera 70 is used to measure the pitch and yaw angles. The beam 40 is rotated clockwise or counterclockwise relative to a fiducial (not shown) on the platform 66 to measure the roll angle as shown by the optical vortex intensity profile images in FIGS. 11 and 12.

Figure 13:
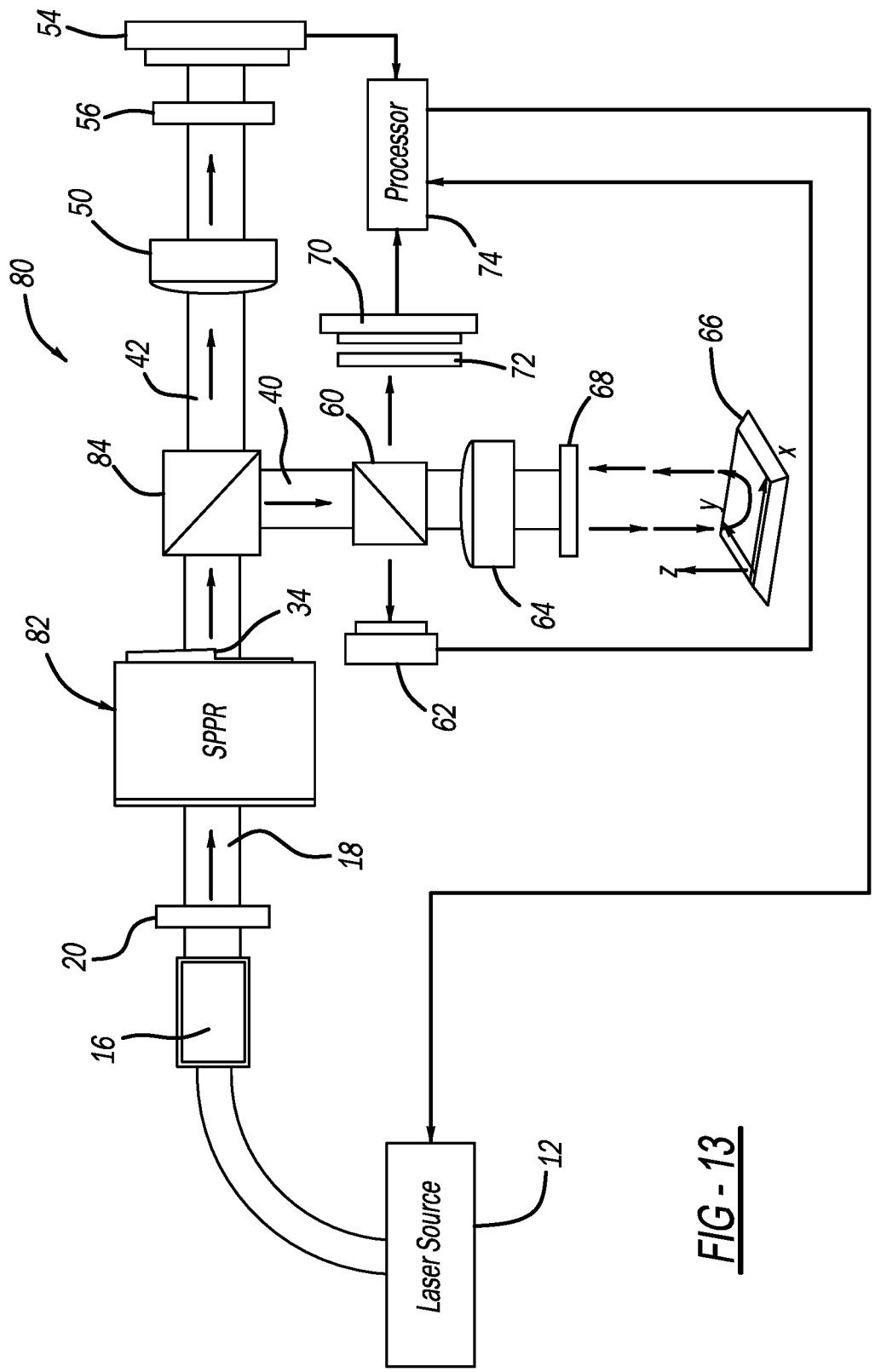
FIG. 13 is a schematic block diagram of a confocal optical protractor for measuring roll, pitch and yaw angles of an element, where a measurement beam is transmitted through an SPPR device.

In the system 10, the measurement beam 40 used to measure the pitch, yaw and roll angles is reflected from the SPPR device 26 to create high contrast fringes because the device 26 has a low internal reflectivity, as discussed. In an alternate embodiment, the SPPR device 26 can be replaced with a mid-range internal reflectivity device, such as $|r_2|^2=0.57$, where the beam transmitted through the device 26 is the measurement beam. FIG. 13 is a schematic block diagram of an optical system 80 of this type for simultaneously measuring roll, pitch and yaw angles, where like elements to the system 10 are identified by the same reference number. In this embodiment, the SPPR device 26 is replaced with an SPPR device 82, which is a custom device having a high internal reflectivity, the detector 24 and the beam splitter 22 are eliminated, and a beam splitter 84 is provided downstream of the SPPR device 82, where the vortex beam from the device 82 is split into the reference beam 42 and the measurement beam 40.

Figure 14:
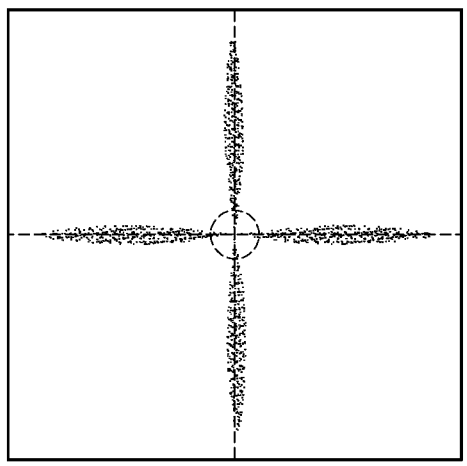
FIG. 14 is an optical vortex intensity profile image showing a beam transmitted through the SPPR device in the protractor shown in FIG. 13.
Figure 15:
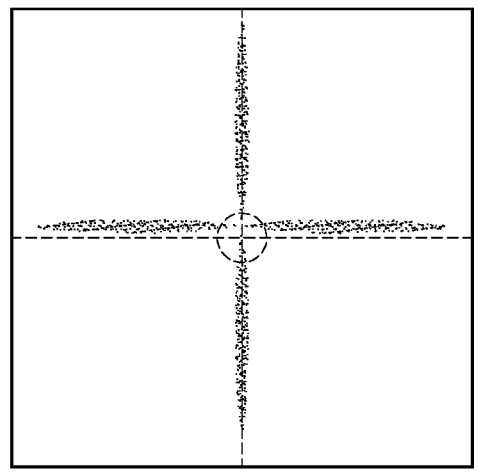
FIGS. 15 and 16 are the optical vortex intensity profile image shown in FIG. 14 with the beam reflected above and below the center point, respectively, for measuring pitch angle.
Figure 16:
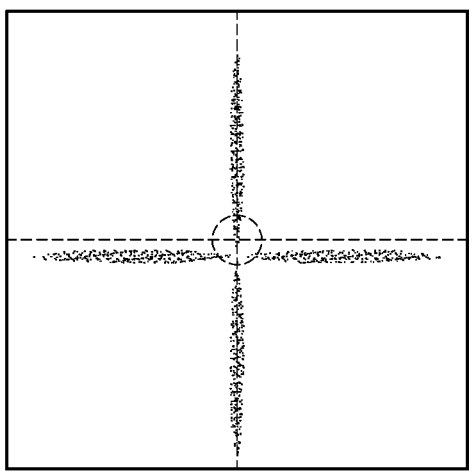
Figure 17:
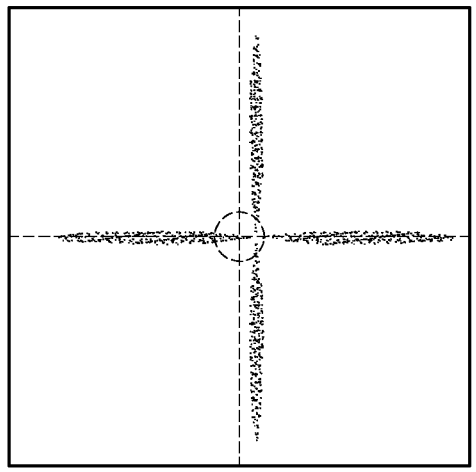
FIGS. 17 and 18 are the optical vortex intensity profile image shown in FIG. 14 with the beam moved to the left side and the right side, respectively, for measuring yaw angle.
Figure 18:
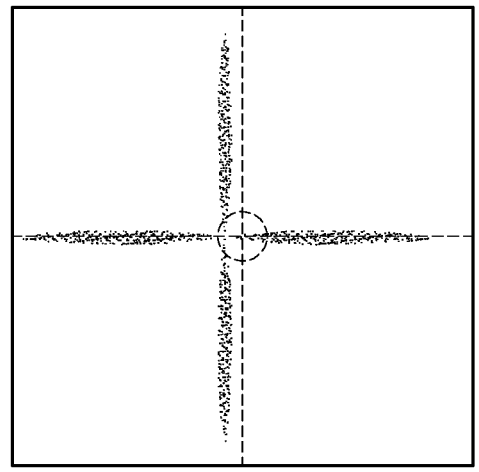
Figure 19:
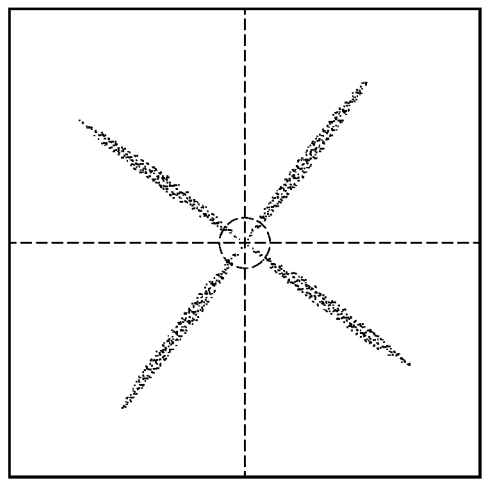
FIGS. 19 and 20 are the optical vortex intensity profile image shown in FIG. 14 with the beam rotated clockwise and counter-clockwise, respectively, for measuring roll angle.
Figure 20:
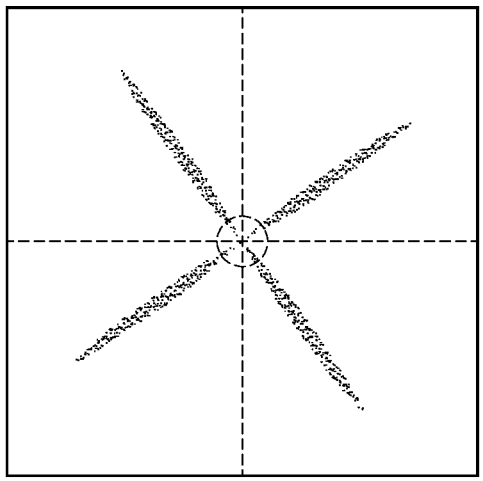

The transmitted beam optical intensity profile through the SPPR device 82 is illustrated in FIG. 14. In the same manner as discussed above for the system 10, the beam 40 is reflected from the platform 66 when it is in a reference position to determine the distance between the platform 66 and camera 70 and identify an initial beam profile. A shift in the beam profile above or below the center point of the initial beam profile along the y-axis in the described orientation is a measure of the pitch angle as shown by the optical vortex intensity profile images in FIGS. 15 and 16. Further, a shift in the beam profile above or below the center point of the initial beam profile along the x-axis in the described orientation is a measure of the yaw angle as shown by the optical vortex intensity profile images in FIGS. 17 and 18. Again, it is the distance to the platform 66 and a shift of the beam 40 on the camera 70 that are to measure the pitch and yaw angles. The beam 40 is rotated clockwise or counter-clockwise relative to a fiducial (not shown) on the platform 66 to measure the roll angle as shown by the optical vortex intensity profile images in FIGS. 19 and 20.

A COTS SPPR device with low reflectivity at its surfaces or a custom fabricated SPPR device with high reflectivity at its surfaces can be used in the confocal optical protractor (COP) for the systems 10 and 80, as described. For a COTS SPPR device, the reflectivity at the surfaces of the device is relatively low, i.e., $|r_2|^2 \sim |0.219|^2 = 0.047$. Thus, there will be approximately two-thirds less photon counts making rotational measurements compared to the maximum number of photons that can be making rotational position measurements on the internal surface of the camera 70, and on the platform 66 of interest. Depending on the albedo of the platform 66, there may be even fewer light particles imaged onto the camera 70. One of the key advantages of this confocal geometry of the optical protractor is the presence of high contrast fringes (unity) regardless of the reflectivity of the SPPR device. This allows for better signal to noise ratio, especially for a COTS SPPR device. When the reflectivity of the SPPR device is increased to a value of $|r_2|^2 = |0.577|^2 = 0.33$, then the maximum number of light particles will be making rotational position measurements in the transmission geometry of the SPPR device for increased signal to noise ratio on the camera 70.

The equations describing the transmission amplitude through the SPPR device 26, and reflection amplitude from the SPPR device 26, can be derived using a matrix formalism. For the purpose of clarity and simplicity, the transmission through the SPPR device 26 or 82 is represented as:

$$T[\phi] = B + A*T_1[\phi, \phi_0, r_2, \beta], \quad (1)$$

where A, B and $\phi_0$ are used to estimate the amplitude, estimate the background, and track the rotation of the angular intensity pattern signal with the fit routines, $T_1[\phi, \phi_0, r_2, \beta]$ is the normalized transmission function that constitutes the angular position $\phi_0$ of an SPPR with a Fresnel reflection coefficient $r_2$, and the number of azimuthally varying intensity peaks $\beta$. The parameters $r_2$ and $\beta$ are known parameters when the system 10 is constructed and does not change during system operation. The reflectivity of the SPPR device 26 or 82 is defined as $|r_2|^2$.

Similarly, the reflection from the SPPR device 26 is represented as:

$$R[\phi] = B + A*R_1[\phi, \phi_0, r_2, \beta], \quad (2)$$

where $R_1[\phi, \phi_0, r_2, \beta]$ is a normalized reflection function.

The roll angle, pitch angle and yaw angle are measured by keeping track of specific properties of the optical vortex beam retro-reflected from the external surface onto the camera 70. These properties include the centroid of the individual intensity peaks, the centroid of the whole optical vortex beam and the rotational displacement of the optical vortex intensity profile. An example is given where there are four intensity peaks projected onto the surface of the platform 66 for which the angles are to be measured. The algorithms for measuring the roll, pitch and yaw angles will enable the position of the individual intensity peaks and the center of the optical vortex to be known to a high degree of accuracy and precision. Due to the four separate intensity peaks, the measurement precision is improved by a factor of four in the measure of the roll angle, pitch angle, and roll angle, compared to if one narrow intensity peak was used to determine the angle. While this design uses four intensity peaks, there could be significantly more intensity peaks or less intensity peaks emerging from the SPPR device 26.

The roll angle is determined by keeping track of the rotation of the optical vortices, i.e., the rotational displacement (angular displacement) of the optical vortex beam on the camera 70. The resolution in the determination of roll angle is quite high, while maintaining a large range over which the roll angle is measured. This angle can be extended over the 360° measurement range. The pitch angle is determined by keeping track of the vertical displacement of the optical vortex beam centroid from the external platform on the camera 70. Similarly, the yaw angle is determined by keeping track of the horizontal displacement of the retro-reflected optical vortex beam from the external platform. The yaw angle and pitch angle are computed from both the distance to the target and the displacement of the beam on the camera 70. Before the optical vortex beam is retro-reflected from the platform 66, it is internally retro-reflected off of the shutter 68 when the shutter 68 is closed to determine the initial position of the optical vortex beam 40. This includes the initial position of the beam centroid, and the initial position of the angular intensity peaks. This process occurs in sequence with the other system calibration processes including laser intensity using the detector 24 and laser frequency calibration using the camera 54, as well as monitoring the internal rotation of the optical vortex beam 40 on the cameras 54 and 70 and the detector 62. In a different embodiment, the initial position could be determined on an external planar surface of known angle for the initial angle calibration. Furthermore, there is a stored transfer function which converts the laser wavelength to rotation of the optical vortex beam.

The angular displacement to measure the roll angle and the displacements to estimate the yaw angle and the pitch angle are estimated from non-linear fitting routines. The yaw angle and the pitch angle are determined from a vertical and horizontal displacement in the centroid of the four intensity peaks, on the x axis and y axis of the camera 70, respectively, as well as distance to the target. The roll angle is determined by the rotational displacement of the intensity peaks. As there are four individual intensity peaks projected onto the camera 70 with unity contrast, these intensity peaks are fitted individually. From the position of the intensity peaks, the centroid of the entire beam is obtained. The centroids are first calculated from the data using the appropriate formula, and then these values are used as initial values in the non-linear fitting routine to track the position of interest. The precise determination of the beam centroid is the first step in determining the angular displacement of the retro-reflected beam. In the event that there is speckle in the images, then multiple images could be averaged together to reduce the effects of speckle.

The determination of the roll, pitch and yaw angles requires knowledge of the absolute center of the beam 40. For an optical vortex beam with a singularity, i.e., a very small optical vortex core (or no core) generated by the SPPR device 26, the center of the beam 40 is defined as the point where all of the intensity peaks come together, which is equivalent to the beam's centroid. An algorithm for computing the center of the beam 40 is discussed below. The algorithm works well for an even number of optical vortex intensity peaks, i.e., when $\beta$ is an even number, and thus for this purpose, it is assumed that $\beta=4$. Nevertheless, the algorithm could be adapted to work well for an odd number of intensity peaks. The algorithm is discussed for two cases, namely, a first case for an optical vortex intensity profile having high contrast fringes of the beam 40 imaged on the camera 70, and a second case for an optical vortex intensity profile having low contrast fringes of the beam 40 imaged on the camera 70. More particularly, depending on the choice of the SPPR device 26 or 82, the camera 70 could receive high or low contrast fringes. When the SPPR device has low reflectivity, then the camera 70 produces images having low contrast fringes, but with a mid to high reflectivity SPPR device, i.e., a custom SPPR device, the camera 70 produces images having high contrast fringes. The camera 70 will always have relatively high contrast fringes for the systems 10 and 80.

Figure 21:
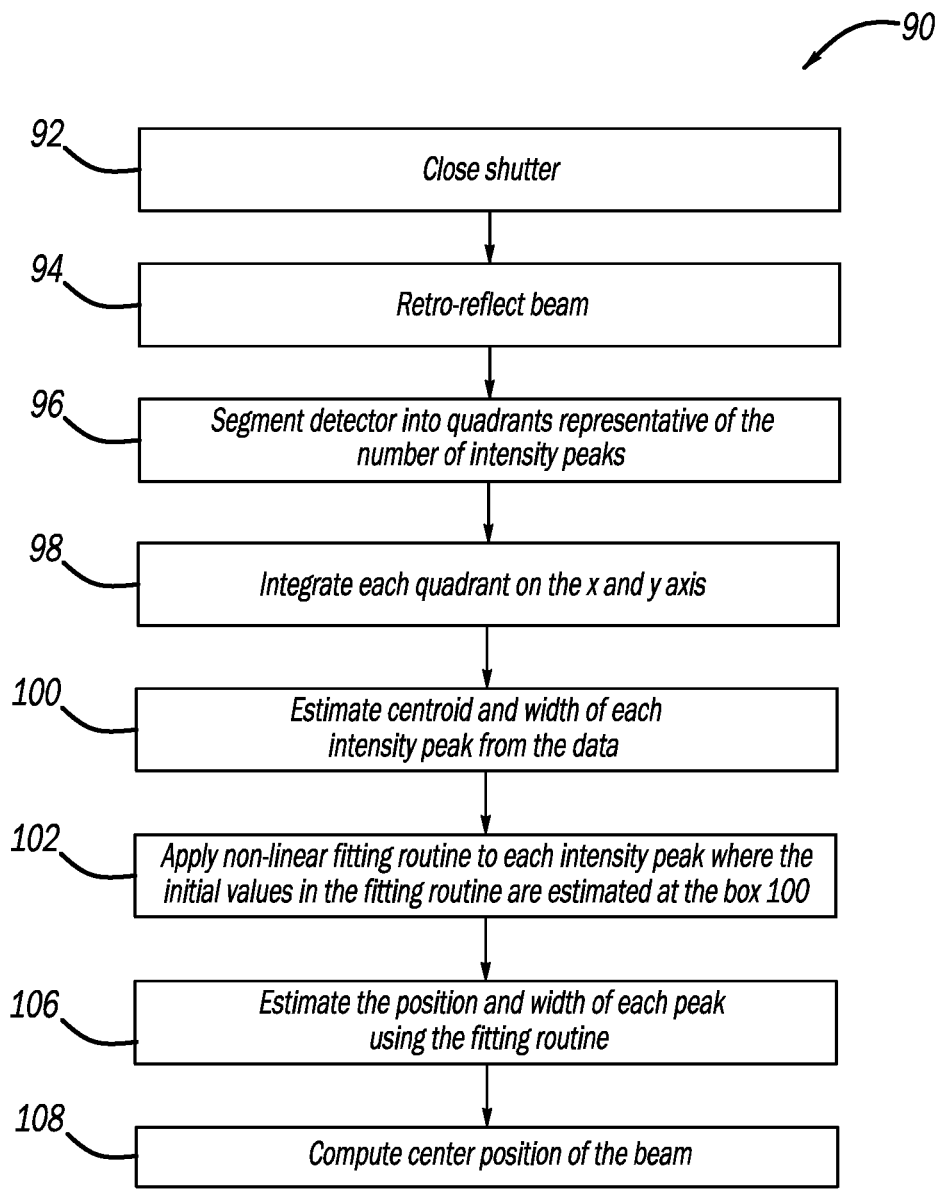
FIG. 21 is a flow chart diagram showing a process for finding a beam centroid for an optical vortex intensity profile image having high contrast fringes.

FIG. 21 is a flow chart diagram 90 showing a process for determining the center of the optical vortex intensity profile having high contrast fringes of the beam 40 imaged on the camera 70. The shutter 68 is closed at box 92 so that there is no light from the external surfaces, although it may not be necessary in some designs to close the shutter 68. When the shutter 68 is closed, the beam 40 is retro-reflected off of the shutter 68 onto the camera 70 at box 94. The pixel screen on the camera 70 is segmented into a number of quadrants representative of the number of intensity peaks in the beam 40 at box 96. In this example, there are four intensity peaks, i.e., β=4, and thus, four quadrants, where each quadrant is integrated on the x-axis and the y-axis at box 98. The centroid and the width of the intensity peak in each quadrant are estimated using the collected data at box 100, and these values are stored individually for all four of the quadrants. A non-linear fitting routine is applied to the intensity peak in each quadrant at box 102, where the initial values in the fitting routine are estimated at the box 100, and where a Gaussian-like function is employed as the model in the fitting routine in one non-limiting embodiment. The x and y centroid position and width of each intensity peak is estimated using the fitting routine at box 106. From the values of the centroid position of each intensity peak, the center position of the beam 40 is computed to sub-pixel accuracy, and the values are stored at box 108. One way of computing the center position of the beam 40 is by taking the average of the respective x and y intensity peaks in diagonal quadrants. The values of the centroid and width of the individual intensity peaks in each quadrant, and the centroid of the entire beam forms the initial position in the determination of angle when the shutter 68 is closed or open.

The low fringe contrast is for the case of optical transmission through an SPPR when the reflectivity of the SPPR device 26 is low. This would be the case for the optical hardware in the system 10, where the image/frame is typically monitored on the camera 54 during dynamic calibration. Finding the center of the optical vortex beam 40 is generally done when the system 10 is initially built. The center point is then monitored using this procedure to ensure that there is no statistically significant deviation in the center position during the system operation.

Figure 22:
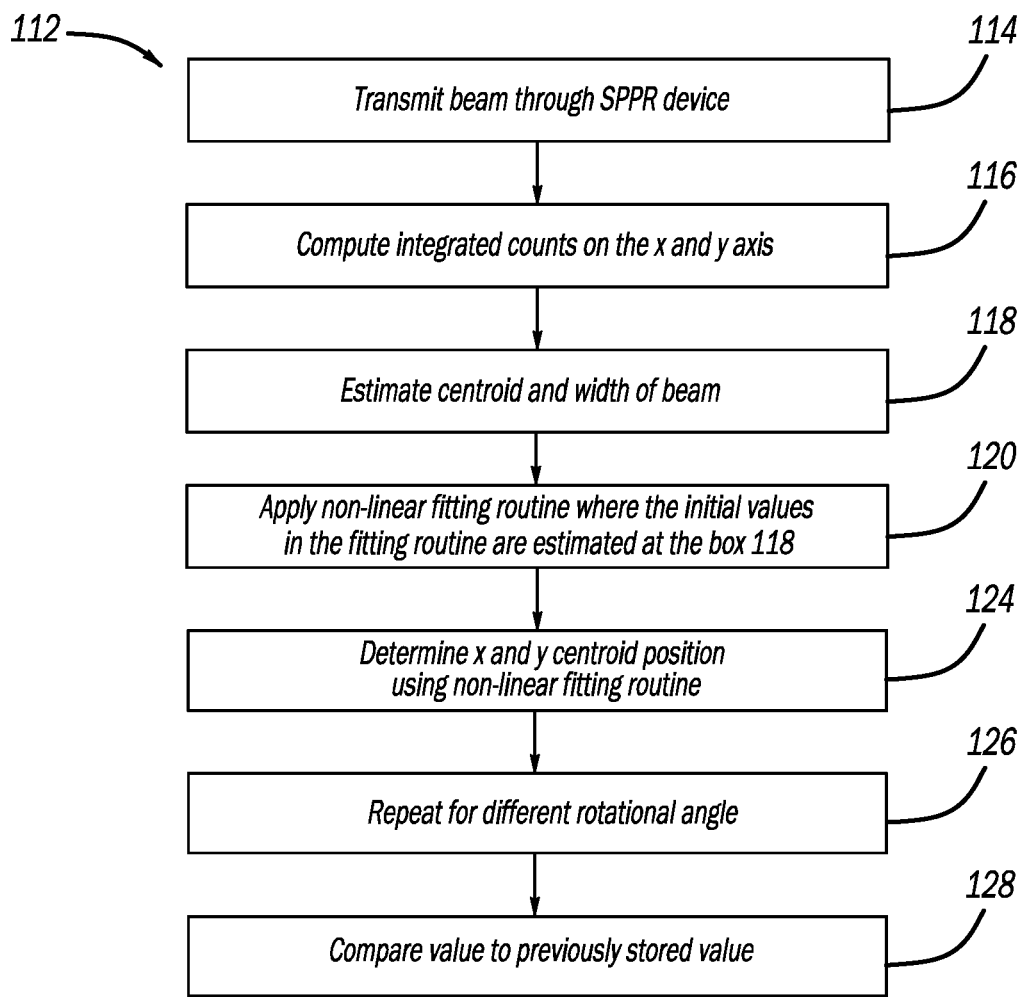
FIG. 22 is a flow chart diagram showing a process for finding a beam centroid for an optical vortex intensity profile image having low contrast fringes.

FIG. 22 is a flow chart diagram 112 showing a process for determining the center of the optical vortex intensity profile having low contrast fringes of the beam 42 imaged on the camera 54. The beam 42 is transmitted through the SPPR device 26 at box 114, and the integrated counts on the x axis and y axis are computed at box 116. The centroid and width of the beam 42 are estimated at box 118 using the collected data, and these values are stored. A non-linear fitting routine is applied to the beam 42 at box 102, where the initial values in the fitting routine are estimated at the box 118, and where a Gaussian-like function is employed as the model in the fitting routine for the whole beam 42 in one non-limiting embodiment. The x and y centroid position and the width of the beam 42 are obtained from the non-linear fitting routine at box 124. The operations at boxes 116 to 124 are repeated at different rotation angles by varying the laser frequency of the beam 42 to ensure the consistency of the beam center (centroid) position at box 126. In the case when a low reflectivity SPPR device is used, this value is compared to the previously stored value of the center position of the beam 42 at box 128. There should not be much deviation from the stored values during the initial calibration. In other words, the deviation should not be more than subpixel values.

Figure 23:
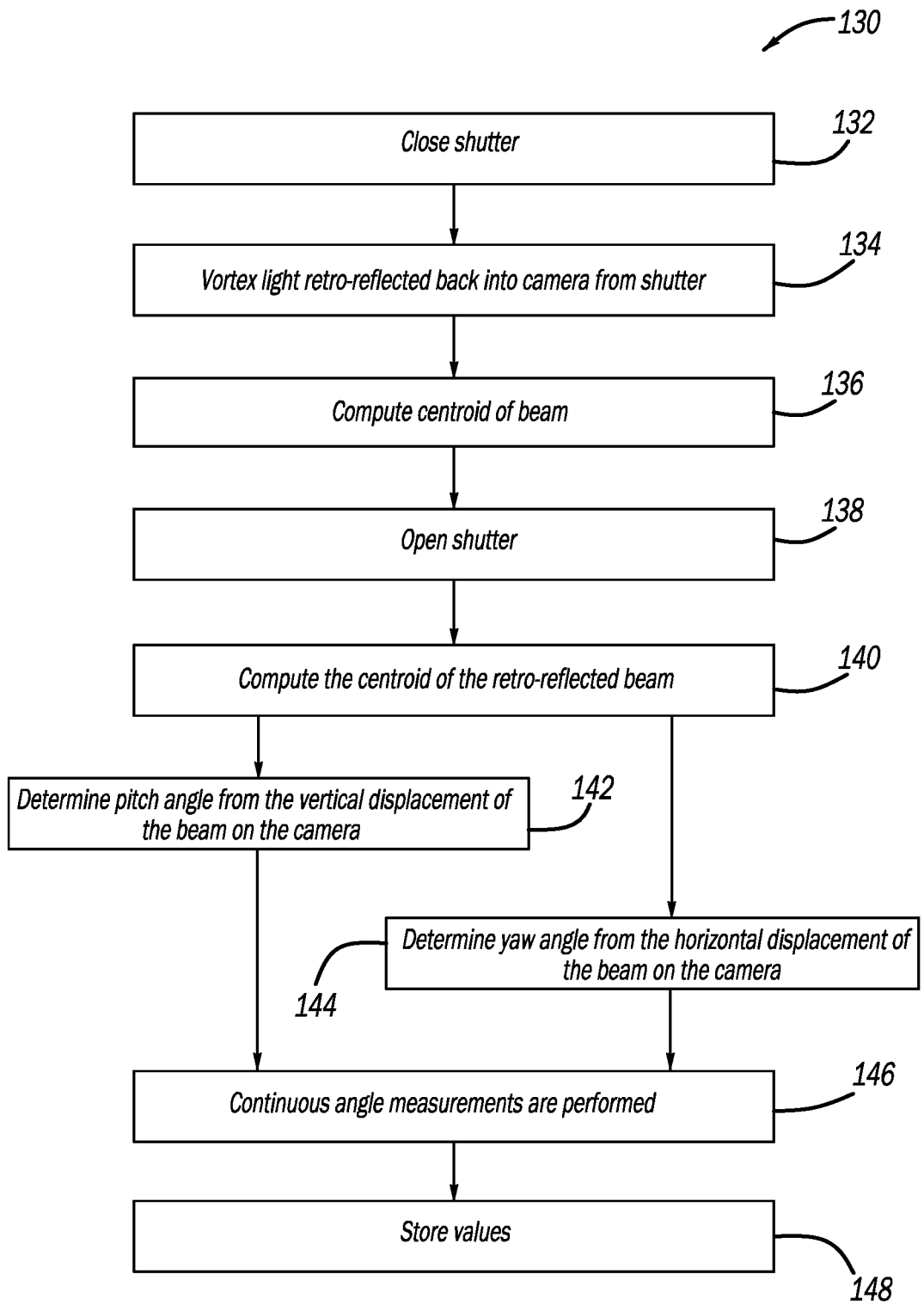
FIG. 23 is a flow chart diagram showing a process for determining pitch angle and yaw angle.

FIG. 23 is a flow chart diagram 130 showing a process for computing the pitch and yaw angles of the platform 66. The shutter 68 is closed at box 132 so that there is no light from the external surface onto the camera 70. The beam 40 is retro-reflected from the shutter 68 (or external calibration surface) and into the camera 70 at box 134. The centroid of the beam 40 is computed as discussed above in the flow chart diagrams 90 or 112 at box 136. The shutter 68 is opened at box 138, and the centroid of the retro-reflected beam is computed at box 140. The pitch angle is determined from the vertical displacement of the beam 40 on the camera 70 at box 142, where each value of vertical displacement corresponds to a measure of the pitch angle. The yaw angle is determined from the horizontal displacement on the camera 70 at box 144, where each value of the horizontal displacement corresponds to a yaw angle. If the pitch angle and the yaw angle are continuously changing, then continuous measurements can be performed to estimate the changing angle as a function of the position on the screen of the camera 70 at box 146. The pitch and yaw angles are stored at box 148.

Figure 24:
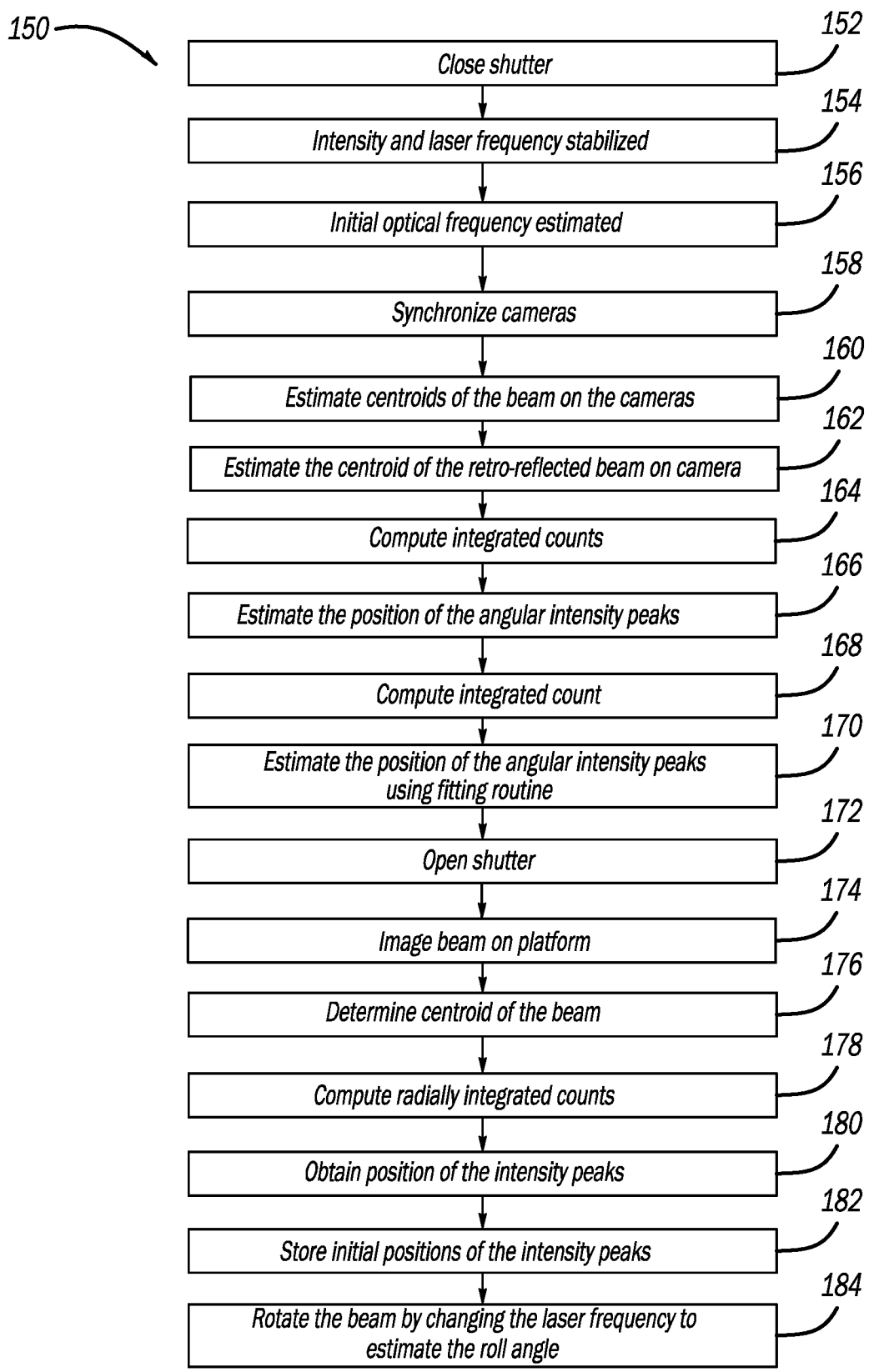
FIG. 24 is a flow chart diagram showing a process for determining roll angle.

FIG. 24 is a flow chart diagram 150 showing a process for computing the roll angle of the platform 66 with respect to a fiducial or between two or more points. The shutter 68 is closed at box 152 so that no light is incident on the platform 66. The intensity of the laser source 12 is stabilized using the detectors 24 and 62 and the camera 54 at box 154, and the initial frequency of the laser source 12 is determined by the angular position of the intensity peak on the cameras 54 and 70 at box 156. The cameras 54 and 70 are synchronized at box 158 to ensure that they receive the image frames simultaneously. The centroid of the beam 40 on the cameras 54 and 70 are estimated as described in the flow diagram 90 or 112 at box 160. The presence of background is subtracted from the values obtained by the non-linear fitting routine. The centroid of the beam 40 that is retro-reflected from the shutter 68 onto the camera 70 is estimated at box 162. The integrated counts along the radial direction starting from the beam centroid position are computed as a function of the roll angle on the camera 54 at box 164, and the positions of the angular intensity peaks using a non-linear fitting routine are estimated at box 166, where these values are stored. The integrated counts along the radial direction starting from the beam centroid position are computed as a function of the roll angle on the camera 70 at box 168, and the positions of the angular intensity peaks using a non-linear fitting routine are estimated at box 170, where these values are stored.

The shutter 68 is opened at box 172, and the beam 40 is projected onto the platform 66 and is imaged on the camera 70 at box 174. The initial frequency of the reflected beam 40 corresponds to the frequency where the orientation of the beam 40 is in alignment to the fiducial on the platform 66. The centroid of the beam 40 imaged on the platform 66 is determined using the flow chart diagram 90 or 112 at box 176. The radially integrated counts starting from the centroid of the beam 40 are computed as a function of the roll angle at box 178. The position of the intensity peaks are obtained from the non-linear optimization fitting routine at box 180. The initial positioning of the intensity peaks for the non-linear fitting routine are stored from the calibration process, where the beam 40 is retro-reflected from the shutter 68, at box 182. When the platform 66 is rotated, the optical vortex beam tracks the rotation through a change in the laser beam frequency, which rotates the orientation of the optical vortex intensity profile. The roll angle is estimated at box 184 from the change in orientation of the optical vortex beam that has been estimated from the positions of the angular intensity peaks on the camera 70. If the platform 66 is rotated in incremental steps, then the optical vortex pattern of the beam 40 can be rotated in incremental steps to determine the roll angle. If there is smooth continuous rotation of the platform 66 at a fast rate, then the roll angle can be obtained using the rotational Doppler shift.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for measuring pitch, yaw and roll angles of an element, said method comprising:
    providing a frequency tunable laser beam;
    directing the laser beam through a spiral phase plate resonator (SPPR) device, said SPPR device including opposing reflective surfaces that reflect the laser beam back and forth in the device, wherein one of the reflective surfaces includes a spiral step index that causes multiple reflected amplitudes having different phases to be combined and generate an optical vortex intensity pattern defined by the phases of the multiple amplitudes, where the intensity pattern includes a singularity centroid and radial light peaks, said SPPR device reflecting or transmitting a first beam and transmitting a second beam;
    reflecting the first beam off of a closed shutter so that the first beam is directed onto a first camera that generates images of the optical vortex intensity pattern;
    directing the second beam onto a second camera that generates images of the optical vortex intensity pattern;
    determining an initial frequency of the laser beam by an angular position of the radial light peaks in the images generated by the first and second cameras;
    synchronizing a registration between the images generated by the first and second cameras;
    determining a location of the centroid in the images generated by the first camera and determining a location of the centroid in the images generated by the second camera;
    determining integrated counts along a radial direction from the centroid in the images generated by the first camera as a function of beam roll angle;
    determining a location of the radial light peaks in the images generated by the first camera using the integrated counts;
    determining integrated counts along a radial direction from the centroid in the images generated by the second camera as a function of beam roll angle;
    determining a location of the radial light peaks in the images generated by the second camera using the integrated counts;
    opening the shutter so that the first beam propagates through the open shutter onto the element and a reflected first beam from the element is directed onto the first camera that again generates images including the optical vortex intensity pattern;
    again determining the location of the centroid in the images generated by the first camera;
    again determining the integrated counts along the radial direction from the centroid in the images generated by the first camera as a function of beam roll angle;
    changing the frequency of the laser beam to rotate the radial light peaks in the optical vortex intensity pattern in the images generated by the first camera; and
    estimating the roll angle of the element from the change in frequency that rotated the optical vortex intensity pattern.

2. The method according to claim 1 wherein determining the location of the radial light peaks includes using a non-linear fitting routine.

3. The method according to claim 1 further comprising determining the pitch angle of the element by a shift of the vortex intensity pattern in one plane in the images generated by the first camera when the shutter is open, and determining the yaw angle of the element by a shift of the vortex intensity pattern in a plane orthogonal to the one plane in the images generated by the first camera when the shutter is open.

4. The method according to claim 1 wherein the SPPR device is a mid to high internal reflectivity device and the first beam is transmitted through the SPPR device, and wherein the radial light peaks have a high contrast fringe.

5. The method according to claim 4 wherein determining the location of the centroid of the optical vortex intensity pattern in the images generated by the first and second cameras includes segmenting the images generated by the first or second camera into a number of quadrants representative of the number of radial light peaks, estimating the location of the centroid and the width of the radial light peak in each quadrant, applying a non-linear fitting routine to each radial light peak, estimating the location of the centroid and the width of the radial light peaks using the non-linear fitting routine, and computing the centroid of the optical vortex intensity pattern using the estimated centroid and width of the radial light peaks in the individual quadrants.

6. The method according to claim 1 wherein the SPPR device is a low internal reflectivity device and the first beam is reflected off of the SPPR device, and wherein the radial light peaks have a low contrast fringe.

7. The method according to claim 6 wherein determining the location of the centroid of the optical vortex intensity pattern in the images generated by the first and second cameras includes estimating the location of the centroid and the width of the second beam, applying a non-linear fitting routine to the second beam, estimating the location of the centroid and the width of the second beam using the non-linear fitting routine, rotating the optical vortex intensity pattern in the second beam by changing the frequency of the laser beam and repeating estimating the location of the centroid and the width of the second beam, applying a non-linear fitting routine to the second beam, and estimating the location of the centroid and the width of the second beam using the non-linear fitting routine.

8. The method according to claim 1 further comprising stabilizing an intensity of the laser beam using a beam intensity detector and a pattern orientation detector before determining the location of the centroid in the images generated by the first and second cameras.

9. The method according to claim 1 further comprising removing background from the images after the centroid in the images generated by the first and second cameras is located.

10. The method according to claim 1 wherein the optical vortex intensity pattern includes four radial light peaks.

11. A method for measuring pitch, yaw and roll angles of an element, said method comprising:
providing a frequency tunable laser beam;
directing the laser beam into a spiral phase plate resonator (SPPR) device, said SPPR device including opposing reflective surfaces that reflect the laser beam back and forth in the device, wherein one of the reflective surfaces includes a spiral step index that causes multiple reflected amplitudes having different phases to be combined and generate an optical vortex intensity pattern defined by the phases of the multiple amplitudes, where the intensity pattern includes a singularity centroid and radial light peaks;
reflecting the laser beam off of the element after it has propagated through the SPPR device so that the laser beam is directed onto a camera that generates images of the optical vortex intensity pattern;
determining a location of the centroid in the images generated by the camera;
determining integrated counts along a radial direction from the centroid in the images generated by the camera as a function of beam roll angle;
determining a location of the radial light peaks in the images generated by the camera using the integrated counts;
changing the frequency of the laser beam to rotate the radial light peaks in the optical vortex intensity pattern in the images generated by the camera; and
estimating the roll angle of the element from the change in frequency that rotated the optical vortex intensity pattern.

12. The method according to claim 11 wherein determining the location of the radial light peaks includes using a non-linear fitting routine.

13. The method according to claim 11 further comprising determining the pitch angle of the element by a shift of the vortex intensity pattern in one plane in the images generated by the camera, and determining the yaw angle of the element by a shift of the vortex intensity pattern in a plane orthogonal to the one plane in the images generated by the camera.

14. The method according to claim 11 wherein the SPPR device is a mid to high internal reflectivity device and the laser beam is transmitted through the SPPR device, and wherein the radial light peaks have a high contrast fringe.

15. The method according to claim 14 wherein determining the location of the centroid of the optical vortex intensity pattern in the images generated by the camera includes segmenting the images generated by the camera into a number of quadrants representative of the number of radial light peaks, estimating the location of the centroid and the width of the radial light peak in each quadrant, applying a non-linear fitting routine to each radial light peak, estimating the location of the centroid and the width of the radial light peaks using the non-linear fitting routine, and computing the centroid of the optical vortex intensity pattern using the estimated centroid and width of the radial light peaks from the individual quadrants.

16. The method according to claim 11 wherein the SPPR device is a low internal reflectivity device and the laser beam is reflected off of the SPPR device, and wherein the radial light peaks have a low contrast fringe.

17. The method according to claim 16 wherein determining the location of the centroid of the optical vortex intensity pattern in the images generated by the camera includes estimating the location of the centroid and the width of the laser beam, applying a non-linear fitting routine to the laser beam, estimating the location of the centroid and the width of the laser beam using the non-linear fitting routine, rotating the optical vortex intensity pattern in the laser beam by changing the frequency of the laser beam and repeating estimating the location of the centroid and the width of the laser beam, applying a non-linear fitting routine to the laser beam, and estimating the location of the centroid and the width of the laser beam using the non-linear fitting routine.

18. The method according to claim 11 further comprising stabilizing an intensity of the laser beam using a beam intensity detector and a pattern orientation detector before determining the location of the centroid in the images generated by the camera.

19. The method according to claim 11 wherein the optical vortex intensity pattern includes four radial light peaks.

20. A method for measuring pitch, yaw and roll angles of an element, said method comprising:
providing a frequency tunable laser beam;
stabilizing an intensity of the laser beam using a beam intensity detector and a pattern orientation detector;
directing the laser beam into a spiral phase plate resonator (SPPR) device, said SPPR device including opposing reflective surfaces that reflect the laser beam back and forth in the device, wherein one of the reflective surfaces includes a spiral step index that causes multiple reflected amplitudes having different phases to be combined and generate an optical vortex intensity pattern defined by the phases of the multiple amplitudes, where the intensity pattern includes a singularity centroid and four radial light peaks;
reflecting the laser beam off of the element after it has propagated through the SPPR device so that the laser beam is directed onto a camera that generates images of the optical vortex intensity pattern;
determining a location of the centroid in the images generated by the camera;
determining integrated counts along a radial direction from the centroid in the images generated by the camera as a function of beam roll angle;
determining a location of the radial light peaks in the images generated by the camera using the integrated counts;
changing the frequency of the laser beam to rotate the radial light peaks in the optical vortex intensity pattern in the images generated by the camera;
estimating the roll angle of the element from the change in frequency that rotated the optical vortex intensity pattern;
determining the pitch angle of the element by a shift of the vortex intensity pattern in one plane in the images generated by the camera; and
determining the yaw angle of the element by a shift of the vortex intensity pattern in a plane orthogonal to the one plane in the images generated by the camera.

* * * * *